US010894381B2

(12) United States Patent
Rothbauer et al.

(10) Patent No.: US 10,894,381 B2
(45) Date of Patent: Jan. 19, 2021

(54) METHOD OF FORMING A REUSABLE COEXTRUDED EMBOSSED NONADHESIVE PROTECTIVE COVER

(71) Applicant: Charter NEX Films, Inc., Milton, WI (US)

(72) Inventors: Jason Lee Rothbauer, Bloomer, WI (US); Gerald James Kolanczyk, Chetek, WI (US)

(73) Assignee: Charter NEX Films, Inc., Milton, WI (US)

( * ) Notice: Subject to any disclaimer, the term of this patent is extended or adjusted under 35 U.S.C. 154(b) by 0 days.

(21) Appl. No.: 16/365,809

(22) Filed: Mar. 27, 2019

(65) Prior Publication Data
US 2019/0263084 A1 Aug. 29, 2019

Related U.S. Application Data

(62) Division of application No. 15/340,096, filed on Nov. 1, 2016, now Pat. No. 10,286,627.

(51) Int. Cl.
*B32B 3/30* (2006.01)
*B32B 27/30* (2006.01)
*B29C 48/00* (2019.01)
(Continued)

(52) U.S. Cl.
CPC .............. *B32B 3/30* (2013.01); *B29C 48/002* (2019.02); *B29C 48/0011* (2019.02);
(Continued)

(58) Field of Classification Search
CPC ....................... B29C 48/022; B29K 2023/0625
(Continued)

(56) References Cited

U.S. PATENT DOCUMENTS 4,061,826 A 12/1977 Petras et al.
4,207,374 A 6/1980 Groff
(Continued)

FOREIGN PATENT DOCUMENTS

DE 4421420 A1 12/1995
JP H02301434 A 12/1990
WO WO 2011156215 A2 12/2011

OTHER PUBLICATIONS

Sequoia, Ceres PVC-free plank, website, received May 9, 2016, 8 pages, CBC Americas Corp, Commack, NY.

*Primary Examiner* — Matthew J Daniels
*Assistant Examiner* — Hana C Page
(74) *Attorney, Agent, or Firm* — Thomas Connelly

(57) ABSTRACT

A method of forming a reusable, non-adhesive protective cover is disclosed which includes extruding first and second layers of a thermoplastic film onto a rotatable cast roll. The first layer has an interior surface and an exterior surface. The second layer is extruded onto the interior surface of the first layer to form a co-extruded laminate. The second layer has an exterior surface exhibiting attachment and release capabilities such that a joint tape can be used to join adjacent sheets of the protective cover together. The co-extruded laminate is then advanced between a nip formed by an embossing roll and a rubber roll whereby the exterior surface of the first layer contacts the embossing roll to form a co-extruded embossed laminate. Lastly, the co-extruded embossed laminate is passed around at least a portion of a chill roll to cool the laminate and form the reusable, co-extruded embossed non-adhesive protective cover.

20 Claims, 5 Drawing Sheets

(51) Int. Cl.
*B29C 48/08* (2019.01)
*B29C 48/21* (2019.01)
*B29C 48/88* (2019.01)
*B29K 25/00* (2006.01)
*B29K 23/00* (2006.01)
*B29L 31/00* (2006.01)
*B29K 105/00* (2006.01)

(52) U.S. Cl.
CPC ............ *B29C 48/022* (2019.02); *B29C 48/08* (2019.02); *B29C 48/21* (2019.02); *B29C 48/914* (2019.02); *B32B 27/302* (2013.01); *B29K 2023/0625* (2013.01); *B29K 2025/04* (2013.01); *B29K 2105/0026* (2013.01); *B29K 2995/0022* (2013.01); *B29K 2995/0072* (2013.01); *B29L 2031/732* (2013.01); *B32B 2305/022* (2013.01); *B32B 2307/3065* (2013.01); *B32B 2307/406* (2013.01); *B32B 2307/746* (2013.01); *B32B 2307/748* (2013.01); *B32B 2471/00* (2013.01)

(58) Field of Classification Search
USPC .................................................... 156/244
See application file for complete search history.

(56) References Cited

U.S. PATENT DOCUMENTS

| | | |
|---|---|---|
| 4,599,265 A | 7/1986 | Esmay |
| 4,981,544 A | 1/1991 | Nordale |
| 5,160,788 A | 11/1992 | Feinberg |
| 5,595,817 A | 1/1997 | Schafer et al. |
| 5,705,006 A | 1/1998 | Roudebush et al. |
| 5,916,391 A | 6/1999 | Riedel et al. |
| 6,387,993 B1 | 5/2002 | Batdorf |
| 6,437,035 B1 | 8/2002 | Young |
| 6,705,054 B2 | 3/2004 | Pelton |
| 6,841,222 B2 * | 1/2005 | Murschall ............... B32B 27/36 106/15.05 |
| 7,442,332 B2 * | 10/2008 | Cancio .................. B29C 48/919 264/173.16 |
| 7,818,941 B2 | 10/2010 | Freudenberg et al. |
| 8,247,054 B2 | 8/2012 | Greer |
| 8,354,463 B2 | 1/2013 | Fever et al. |
| 8,394,879 B1 * | 3/2013 | Bradshaw ............... C08L 23/10 524/414 |
| 8,764,245 B2 | 7/2014 | Chen et al. |
| 9,938,401 B2 * | 4/2018 | de Boer ................. C08L 23/12 |
| 2007/0036945 A1 * | 2/2007 | Balakoff ................ B32B 25/04 428/141 |
| 2007/0048482 A1 | 3/2007 | Kadlec |
| 2007/0078211 A1 * | 4/2007 | Chang .................... C08L 23/10 524/436 |
| 2008/0102243 A1 | 5/2008 | Gupta |
| 2008/0206583 A1 | 8/2008 | Phan et al. |
| 2009/0068431 A1 | 3/2009 | Hoenigmann |
| 2014/0128527 A1 | 5/2014 | de Boer et al. |
| 2014/0363611 A1 | 12/2014 | Yoshida |
| 2015/0093548 A1 | 4/2015 | Robbins, III et al. |
| 2015/0251375 A1 | 9/2015 | Lin |

* cited by examiner

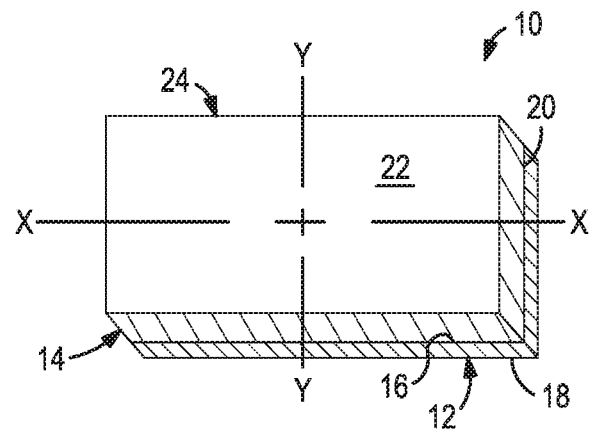 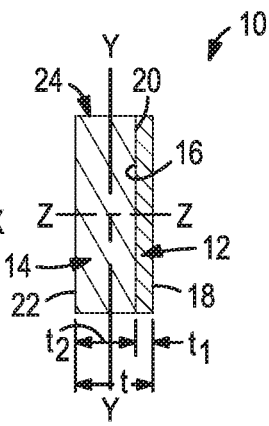
FIG. 1  FIG. 2
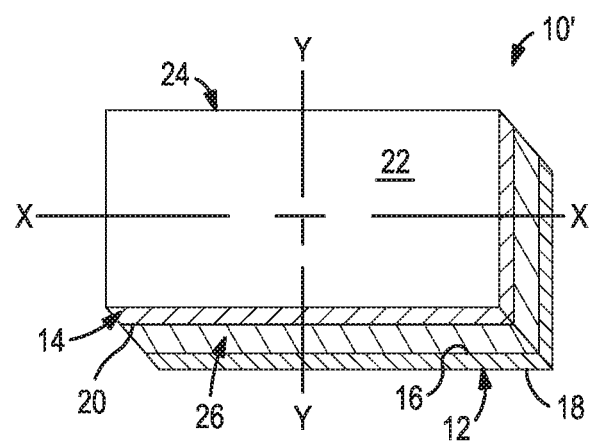 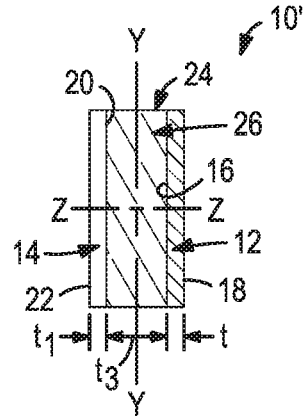
FIG. 3  FIG. 4
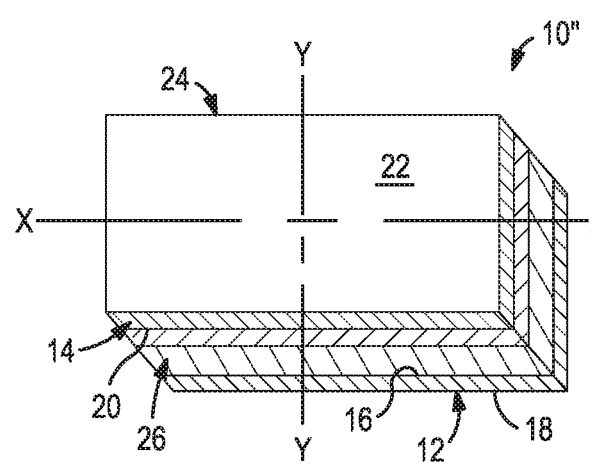 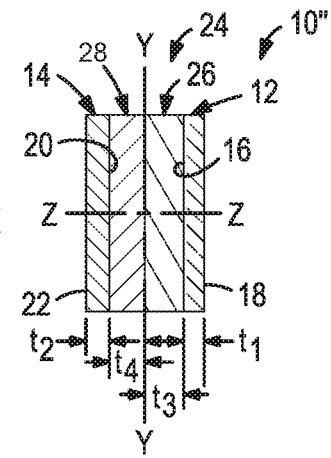
FIG. 5  FIG. 6

METHOD OF FORMING A REUSABLE COEXTRUDED EMBOSSED NONADHESIVE PROTECTIVE COVER

CROSS REFERENCE TO RELATED APPLICATIONS

This application is a divisional patent application of U.S. Ser. No. 15/340,096, filed Nov. 1, 2016 and claims priority thereto.

FIELD OF THE INVENTION

This invention relates to a method of forming a reusable, co-extruded embossed non-adhesive protective cover which can be used to temporarily protect floors, walls and other hard surfaces, especially in the construction industry.

BACKGROUND OF THE INVENTION

There is currently a need for a reusable, non-adhesive protective cover which can be used to cover floors, walls and other hard surfaces, during construction, in order to protect them from being damaged. The reusable, non-adhesive protective cover must be flame retardant without utilizing polyvinyl chloride (PVC). Polyvinyl chloride is a fire retardant but when it burns, it creates environmental problems.

The reusable, non-adhesive protective cover must meet a number of international fire and/or flame retardant standards, such as the Loss Prevention Standard 1207, the National Fire Protection Association Standard 701, and the British Standard 5852.

In addition to being fire and flame retardant, the reusable, non-adhesive protective cover must also exhibit the ability to stay in place. Currently, some protective covers use an adhesive coating to keep them in place. A major disadvantage with the adhesively coated covers is that once the adhesive coating become fouled with dirt and dust, it reduces the ability of the adhesive to retain the cover in place. Furthermore, an adhesively coated protective cover which has been contaminated at one job site may damage the surface it is designed to protect at a subsequent job site.

Another consideration is that the reusable, non-adhesive protective cover should exhibit the proper coefficient of friction and peel adhesion for the job at hand. Sometimes, it may be desirable for the surface of the reusable, non-adhesive protective cover, which is positioned adjacent to a floor, wall or object, to have a high coefficient of friction with little or no peel adhesion. This is especially true when the reusable, non-adhesive protective cover is used to protect a glossy surface. Alternatively, in other situations, it may be advantageous to lightly adhere the surface of the reusable, non-adhesive protective cover to an exterior surface of a three dimensional object, that may have to be moved frequently. In this case, the reusable, non-adhesive protective cover may need to have a moderate coefficient of friction and a low peel adhesion. In still other situations, such as when the reusable, non-adhesive protective cover is attached to a wall, there may be a need for the reusable, non-adhesive protective cover to have a moderate coefficient of friction and a moderate peel adhesion.

The non-contact surface of the reusable, non-adhesive protective cover should exhibit the proper attachment and release capabilities such that a joint tape can be used to join adjacent sheets of the reusable, non-adhesive protective cover together. Sometimes, two or more sheets of the reusable, non-adhesive protective cover will need to be joined together to cover large sections of a floor or wall. Other times, it may be necessary to join two or more sheets of the reusable, non-adhesive protective cover together to form a waterproof seal. When it is time to separate the sheets of the reusable, non-adhesive protective cover, the reusable, non-adhesive protective cover should also have adequate material strength properties to allow the joint tape to be removed without tearing or damaging the reusable, non-adhesive protective cover.

In addition to the reusable, non-adhesive protective cover having the aforementioned properties and characteristics, the reusable, non-adhesive protective cover has to be capable of being manufactured in an inexpensive fashion such that it will present a cost savings to the industry.

Now, a method of forming a reusable, non-adhesive protective cover has been invented.

SUMMARY OF THE INVENTION

Briefly, this invention relates to a reusable, non-adhesive protective cover which includes a first layer having an exterior surface designed to contact a structure or object and a second layer having an exterior surface designed to be spaced away from the structure or object. Each of the first and second layers are formed from a thermoplastic film and are joined together to form a laminate which is free of polyvinyl chloride. Each of the first and second layers contains at least about 5% of a flame retardant. The first layer also has a static coefficient of friction (COF) of at least about 0.5. The second layer exhibits attachment and release capabilities such that a joint tape can be used to join adjacent sheets of the reusable, non-adhesive protective cover together. The properties of the second layer allow the joint tape to be removed without damaging the reusable, non-adhesive protective cover.

In another embodiment, a reusable, non-adhesive protective cover is taught which has a first layer with an exterior surface designed to contact a structure or object and a second layer having an exterior surface designed to be spaced away from the structure or object. This reusable, non-adhesive protective cover also includes a third layer positioned between the first and second layers. Each of the first, second and third layers are formed from a thermoplastic film and are joined together to form a laminate which is free of polyvinyl chloride. Each of the first, second and third layers contains at least about 5% of a flame retardant. The first layer has a static coefficient of friction (COF) of at least about 0.7. The second layer exhibits attachment and release capabilities such that a joint tape can be used to join adjacent sheets of the reusable, non-adhesive protective cover together. The properties of the second layer allow the joint tape to be removed without damaging the reusable, non-adhesive protective cover.

Several methods of forming a reusable, non-adhesive protective cover are also taught. One method includes the steps of co-extruding first and second thermoplastic film layers onto a rotatable cast roll with projections. The first layer has an interior surface and an exterior surface. The first thermoplastic film layer contains from between about 5% to about 20% of a flame retardant. The first layer also has a static coefficient of friction (COF) of at least about 0.5. The second thermoplastic film layer has an exterior surface exhibiting predetermined attachment and release capabilities such that a joint tape can be used to join adjacent sheets of the reusable, non-adhesive protective cover together. The second thermoplastic film layer also contains from between about 5% to about 20% of a flame retardant. The co-extruded thermoplastic laminate is then advanced between a nip formed by the cast roll and a rubber roll thus forming an embossed thermoplastic laminate. Lastly, the embossed thermoplastic laminate is passed around a portion of a chill roll to cool the thermoplastic laminate and form the reusable, non-adhesive protective cover. This reusable, non-adhesive protective cover is free of polyvinyl chloride.

The general object of this invention is to provide a method of forming a reusable, non-adhesive protective cover which can be used to cover floors, walls and other hard surfaces, during construction, in order to protect them from being damaged. A more specific object of this invention is to provide a method of forming a reusable, non-adhesive protective cover which is flame retardant.

Another object of this invention is to provide a method of forming a reusable, non-adhesive protective cover which exhibits a static coefficient of friction of at least about 0.5 and a peel adhesion for the job at hand.

A further object of this invention is to provide a method of forming a reusable, non-adhesive protective cover which exhibits the proper attachment and release capabilities such that a joint tape can be used to join adjacent sheets of the reusable, non-adhesive protective cover together.

Still another object of this invention is to provide a method of forming a reusable, non-adhesive protective cover which can be washed and reused multiple times, and which may contain protrusions which assist in unwinding a finished roll for use and which also improve the slip resistance of the protective cover when it is used to cover a floor that may be damp or wet.

Still further, an object of this invention is to provide a method of forming a reusable, non-adhesive protective cover which is economical to manufacture.

Other objects and advantages of the present invention will become more apparent to those skilled in the art in view of the following description and the accompanying drawings.

BRIEF DESCRIPTION OF THE DRAWINGS

FIG. 1 is a perspective view of a two layer reusable, non-adhesive protective cover.

FIG. 2 is a side view of the two layer reusable, non-adhesive protective cover shown in FIG. 1.

FIG. 3 is a perspective view of a three layer reusable, non-adhesive protective cover.

FIG. 4 is a side view of the three layer reusable, non-adhesive protective cover shown in FIG. 3.

FIG. 5 is a perspective view of a four layer reusable, non-adhesive protective cover.

FIG. 6 is a side view of the four layer reusable, non-adhesive protective cover shown in FIG. 5.

DETAILED DESCRIPTION OF THE INVENTION

Figure 7:
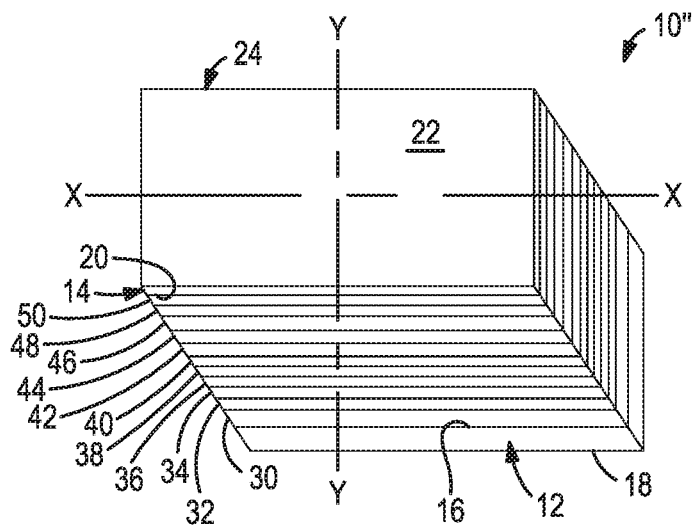
FIG. 7 is a perspective view of a thirteen layer reusable, non-adhesive protective cover.

Referring to FIGS. 1 and 2, a reusable, non-adhesive protective cover 10 is shown which can be used to cover floors, walls or other hard surfaces, during construction, in order to protect them from being damaged. The reusable, non-adhesive protective cover 10 can also be used to cover any surface during a manufacturing, building or repair process. By "reusable" it is meant that the non-adhesive protective cover 10 can be used more than once before it is discarded or recycled. By "non-adhesive" it is meant that the protective cover 10 does not include or use any adhesive in its construction. The reusable, non-adhesive protective cover 10 is flame retardant, leakproof, waterproof, water resistant, slip resistant, dust free and durable. The reusable, non-adhesive protective cover 10 can also be used in clean rooms and in health care environments. This reusable, non-adhesive protective cover 10 can be used time and again, plus it is recyclable after its intended life.

Still referring to FIGS. 1 and 2, the reusable, non-adhesive protective cover 10 is shown as a rectangular sheet having a longitudinal central axis X-X, a vertical central axis Y-Y and a transverse central axis Z-Z. Although depicted as a rectangular sheet, the reusable, non-adhesive protective cover 10 could be manufactured in a variety of geometrical shapes, including, but not limited to: a square, a circle, a triangle, etc.

The reusable, non-adhesive protective cover 10 can be constructed of two or more layers. Desirably, the reusable, non-adhesive protective cover 10 is a multi-layered structure. In the two layer embodiment, the reusable, non-adhesive protective cover 10 includes a first layer 12 and a second layer 14. The first layer 12 has an interior surface 16 and an exterior surface 18. The exterior surface 18 is designed to contact a structure or object. The exterior surface 18 is sometimes referred to as the "contact surface". The second layer 14 also has an interior surface 20 and an exterior surface 22, The interior surface 20 of the second layer 14 is secured to the interior surface 16 of the first layer 12. The two interior surfaces 16 and 20 can be secured to one another by bonding, such as by using heat, by using pressure, by using a combination of heat and pressure, or by some other means known to those skilled in the art. The exterior surface 22 of the second layer 14 is spaced away from the structure or object which is to be covered. The exterior surface 22 is sometimes referred to as the "non-contact surface".

Each of the first and second layers, 12 and 14 respectively, are formed from a polymer, copolymer or homopolymer into a thermoplastic film. The first layer 12 can be formed from an identical material or from a different material which is used to form the second layer 14. Each of the first and second layers, 12 and 14 respectively, can be formed from almost any polymer, copolymer or homopolymer known to those skilled in the art. A polymer, copolymer or homopolymer resin can be used to form the thermoplastic film. Various processes known to those skilled in the art can be used to form a thermoplastic film from a resin. Examples of two processes which can be used include: a coextruded film process and a manifold co-extrusion film process. The thermoplastic film produced by either process can be embossed or be non-embossed.

Various polyolefins can be used to create the thermoplastic film. Examples of some specific polyolefins include, but are not limited to: polypropylene, polyethylene, low density polypropylene, linear low density polypropylene, high density polypropylene, low density polyethylene, linear low density polyethylene, high density polyethylene, ethylene propylene copolymer, metallocene-catalyzed polyolefins, a styrene block copolymer, etc. For example, either of the first or second layers, 12 or 14 respectively, could be formed from at least about 50% of a styrene block copolymer. Desirably, either of the first or second layers, 12 or 14 respectively, could be formed from at least about 60% of a styrene block copolymer. More desirably, either of the first or second layers, 12 or 14 respectively, could be formed from at least about 65% of a styrene block copolymer. Even more desirably, either of the first or second layers, 12 or 14 respectively, could be formed from about 70% of a styrene block copolymer.

Each of the first and second layers, 12 and 14 respectively, can be of a homogeneous construction. By "homogeneous" it is meant that the layer is of the same or similar nature or kind. Alternatively, each of the first and second layers, 12 and 14 respectively, can be of a heterogeneous construction where each layer is different.

The first and second layers, 12 and 14 respectively, are joined together to form a laminate 24. The laminate 24 can be a thermoplastic laminate. The laminate 24 has an overall thickness (not designated) which ranges from between about 5 mils to about 100 mils or greater, (1 mil=0.001 inches). Desirably, the overall thickness of the laminate 24 can range from between about 5 mils to about 80 mils. More desirably, the overall thickness of the laminate 24 can range from between about 5 mils to about 70 mils. Even more desirably, the overall thickness of the laminate 24 can range from between about 5 mils to about 60 mils.

The laminate 24 is free or void of any polyvinyl chloride (PVC). Polyvinyl chloride (PVC) is one of a group of polymerized thermoplastic vinyls. Polyvinyl chloride is a fire retardant but when it burns, it creates environmental problems. PVC decomposes in the range of from between about 302° Fahrenheit (F) to about 572° F. PVC flash ignites at 735° F. and self-ignites at 850° F. Up to about 446° F., hydrogen chloride is given off in a white mist and carbon monoxide (CO) is given off mainly above 482° F. From between about 752° F. to about 1,112° F., ethylene, benzene, naphthalene, and other hydrocarbons are produced. When these products are burned with sufficient oxygen, hydrogen chloride, carbon monoxide and carbon dioxide are produced. Such toxic gases are harmful to humans. For this reason, companies have moved away from manufacturing protective covers which contain polyvinyl chloride. The reusable, non-adhesive protective cover 10 is free or void of any polyvinyl chloride.

Still referring to FIGS. 1 and 2, desirably each of the first and second layers, 12 and 14 respectively, contains a flame retardant. Certain chemicals or substances act as both a fire retardant and as a flame retardant. When such a chemical or substance is added to each of the first and second layers, 12 and 14 respectively, the first and second layers, 12 and 14 respectively, become resistant to catching fire and/or bursting into flame. By "fire" it is meant a chemical change that releases heat and light and is accompanied by flame, especially the exothermic oxidation of a combustible substance. By "fire retardant" it is meant resistant to catching fire. By "flame retardant" it is meant resistant to bursting into a flame. Each of the first and second layers, 12 and 14 respectively, can contain at least about 5% of a flame retardant. Desirably, each of the first and second layers, 12 and 14 respectively, contains at least about 8% of a flame retardant. More desirably, each of the first and second layers, 12 and 14 respectively, contains at least about 10% of a flame retardant. Even more desirably, each of the first and second layers, 12 and 14 respectively, contains at least about 12% of a flame retardant. Most desirably, each of the first and second layers, 12 and 14 respectively, contains from between about 5% to about 20% of a flame retardant.

A good flame retardant is Extensity 0201-127 commercially sold by Saco AE Polymers, 3220 Crocker Ave., Sheboygan, Wis. 53081. Decabromodiphenyl ethane, such as FR-1410, is another good flame retardant. FR-1410 is manufactured by ICL Industrial Products, having a corporate headquarters at Makeleff House, 12 Kroitzer Street, P.O. Box 180, Beer Sheva, 84101 Israel.

The reusable, non-adhesive protective cover 10 is designed to meet the following tests:
1. The National Fire Protection Association (NFPA) Test Method 701-2010 for flame propagation of textiles and films;
2. The National Fire Protection Association (NFPA) Test Method UL 723 for flame spread and smoke developed;
3. The National Fire Protection Association (NFPA) Test Method 701-04 (small scale) Flammability test;
4. British Standard (BS)2782: part 1: Method 141: 1986, British Standard European Norm (EN)2825 and EN2826, 135476, BS476: Part 12: 1991 Ignition Source C and Large Flame Test to Loss Prevention Standard (LPS) 1207: 1994 Section 3.1.3;
5. The Federal GSA (General Services Administration) Standard 191 Method 5903—Federal Standard for textile methods—Fire Retardant Test.

In addition, selected samples of the reusable, non-adhesive protective cover 10 have been subjected to a series of tests utilizing the test methodology contained in Loss Prevention Standard (LPS) 1207, issued January, 2002 by Building Research Establishment (BRE). BRE is a former United Kingdom (UK) government establishment but now is a private organization that carries out research, consultancy and testing for the construction and built environment sectors in the UK. The BRE is headquartered in Watford with regional sites in Glasgow and Swansea. Among the BRE's areas of interest are participation in the preparation of national and international standards and building codes, including the UK Building Regulations. The organization is now funded by income from its commercial programs, the BRE bookshop, contracted work, and by bidding for research funding from government and the industries it serves. The BRE also has UKAS Accredited Testing Laboratories.

These tests included:
1. Small Flame Test—carried out to British Standard (BS) 476: part 12, issued 1991. This test method tests building materials and structures for ignitability by direct flame impingement. The method uses a choice of seven flaming ignition sources for a variety of flame application times.
2. Large Flame Test—using Crib No. 7 from British Standard (BS) 5852. BS 5852 describes the best practice methods to assess the ignitability of single material combinations, such as covers and fillings used in upholstered seating, or complete items of seating. These tests determine the effects of a smoldering cigarette, or other flaming ignition sources, such as burning matches or a four-sheet full-size newspaper. This standard can be used to establish the potential ignitability of components in conjunction with other specified materials. BS 5852, issued 2006, first looks at the criteria of ignition, and the health and safety of operators. It then explains the various apparatus, before focusing on smoldering ignition sources—such as a cigarette, butane gas flames and flaming wooden cribs. It also looks at ways to test for the ignitability of upholstery composites and complete items of furniture.

3. Smoke & Toxic Gas Emission—using equipment and procedure as per British Standard European Norm (EN) 2824, EN 2825, and EN 2826—Aerospace Series. This standard tests the burning behavior of non-metallic materials under the influence of radiating heat and flames to determine the smoke density and gas components in the smoke of the burning materials.

4. Oxygen Index—carried out according to British Standard (BS) 2782, part 1: method 141; 1986. This is a widely used test which provides a single figure related to ignitability. Limiting Oxygen Index (LOI) is the percent concentration of oxygen at which a small specimen will only just burn downwards in a candle like manner. The test is probably the most well-known of the standard fire tests. The apparatus holds a small specimen of material which is clamped vertically in a tube in an atmosphere where the relative concentration of oxygen and nitrogen a small pilot flame to find the minimum oxygen concentration required to just sustain combustion of the sample.

Referring now to FIG. 2, one will notice that the reusable, non-adhesive protective cover 10 has a thickness t. This thickness t can vary in dimension. Desirably, the thickness t ranges from between about 5 mils (1 mil=0.001 inches) to about 100 mils, More desirably, the thickness t ranges from between about 5 mils to about 80 mils. Even more desirably, the thickness t ranges from between about 5 mils to about 60 mils.

The first layer 12 of the reusable, non-adhesive protective cover 10 has a thickness $t_1$. The thickness $t_1$ of the first layer 12 can vary in dimension. Generally, the thickness $t_1$ of the first layer 12 ranges from between about 1 mil to about 10 mils. Desirably, the thickness $t_1$ of the first layer 12 ranges from between about 1 mil to about 8 mils. More desirably, the thickness $t_1$ of the first layer 12 is less than about 7 mils. Even more desirably, the thickness $t_1$ of the first layer 12 is less than about 6 mils. Most desirably, the thickness $t_1$ of the first layer 12 is less than about 5 mils.

Still referring to FIG. 2, the second layer 14 has a thickness $t_2$. The thickness $t_2$ of the second layer 14 can vary in dimension. Generally, the thickness $t_2$ of the second layer 14 is greater than the thickness $t_1$ of the first layer 12, The thickness $t_2$ of the second layer 14 can range from between about 1 mil to about 60 mils. Desirably, the thickness $t_2$ of the second layer 14 can range from between about 2 mils to about 55 mils. More desirably, the thickness $t_2$ of the second layer 14 is less than about 40 mils. Even more desirably, the thickness $t_2$ of the second layer 14 is less than about 30 mils, Most desirably, the thickness $t_2$ of the second layer 14 is less than about 20 mils.

In FIG. 2, the thickness $t_1$ of the first layer 12 is depicted as being less than the thickness $t_2$ of the second layer 14. This is generally the case. For a reusable, non-adhesive protective cover 10 constructed of two layers 12 and 14, the first layer 12 usually accounts for about 20% of the total thickness t when the non-adhesive protective cover 10 has a total thickness t of about 20 mils or less. When the reusable, non-adhesive protective cover 10 has a total thickness t of greater than about 20 mils, the first layer 12 usually accounts for about 10% of the total thickness t. However, one could construct the first layer 12 so that its thickness $t_1$ is equal to the thickness $t_2$ of the second layer 14. Alternatively, the thickness $t_1$ of the first layer 12 could be greater than the thickness $t_2$ of the second layer 14, if desired.

Referring again to FIGS. 1 and 2, the first layer 12 has a high average, static coefficient of friction (SCOF) as measured by the American Society for Testing and Materials (ASTM) C1 028-96, anti-slip, anti-skid test. The first layer 12 has a SCOF of at least about 0.5. Desirably, the first layer 12 has a SCOF of at least about 0.7. More desirably, the first layer 12 has a SCOF of at least about 1.0. Even more desirably, the first layer 12 has a SCOF of at least about 1.5. Most desirably, the first layer 12 has a SCOF of at least about 2.0.

The coefficient of friction (COF), often symbolized by the Greek letter $\mu$, is a dimensionless scalar value which describes the ratio of the force of friction between two bodies and the force pressing them together. The coefficient of friction depends on the materials used: for example, ice on steel has a low coefficient of friction, while rubber on pavement has a high coefficient of friction. Coefficients of friction range from near zero to greater than one. Arthur Morin introduced the term and demonstrated the utility of the coefficient of friction. The coefficient of friction is an empirical measurement—it has to be measured experimentally, and cannot be found through calculations. Rougher surfaces tend to have higher effective values. Both static and kinetic coefficients of friction depend on the pair of surfaces in contact: for a given pair of surfaces, the static coefficient of friction is usually larger than the kinetic coefficient of friction. In some sets, the two coefficients are equal, such as Teflon on Teflon.

Most dry materials have a coefficient of friction (COF) value ranging from between about 0.3 to about 0.6. Values outside this range are rarer, but Teflon, for example, can have a coefficient of friction (COF) value as low as 0.04. A value of zero would mean no friction at all, an elusive property. Rubber in contact with other surfaces can yield coefficient of friction (COF) values of from between about 1 to about 2. Occasionally, it is maintained that $\mu$ is always less than 1, but this is not true. While in most relevant applications $\mu$ is less than 1, a value above 1 merely implies that the force required to slide an object along the surface is greater than the normal force of the surface on the object. For example, silicone rubber or acrylic rubber-coated surfaces have a coefficient of friction (COF) that can be substantially larger than 1.

While it is often stated that the COF is a "material property", it is better categorized as a "system property". Unlike true material properties (such as conductivity, dielectric constant, yield strength), the COF for any two materials depends on system variables like temperature, velocity, atmosphere and also what are now popularly described as aging and de-aging times; as well as on geometric properties of the interface between the materials. For example, a copper pin sliding against a thick copper plate can have a COF that varies from 0.6 at low speeds (metal sliding against metal) to below 0.2 at high speeds when the copper surface begins to melt due to frictional heating. The latter speed of course, does not determine the COF uniquely; if the pin diameter is increased so that the frictional heating is removed rapidly, the temperature drops, the pin remains solid and the COF rises to that of a "low speed" test.

Various chemicals, substances, polymers, copolymers or elastomers can be added to the first layer 12 to increase the COF. Kraton® is a styrene block copolymer that can be added to increase the COF of the first layer 12. Kraton® is a registered trademark of Shell Oil Company having an office at One Shell Plaza, 910 Louisiana, Houston, Tex. 77002. "KRATON and a logo" is also a registered trademark for a number of high performance elastomers manufactured by Kraton Performance Polymers, Inc. having an office at 15710 John F. Kennedy Boulevard, Suite 300. Houston, Tex. 77032-2347. Kraton® polymers offer many of the properties of natural rubber, such as flexibility, high traction, and sealing abilities, but increased resistance to heat, weathering, and chemicals. Vistamaxx™ is another polymer which can be added to increase the COF of the first layer 12. Vistamaxx™ is commercially available from Exxon Mobil Corporation having an office at 5959 Las Colinas Boulevard, Irving, Tex. 75039-2298.

It should be noted that there is no need to increase the static coefficient of friction (SCOF) of the second layer 14 since it will be spaced away from the structure or object being covered.

The first layer 12 can contain from between about 10% to about 80% of Kraton®. Desirably, the first layer 12 contains from between about 20% to about 75% of Kraton®. More desirably, the first layer 12 contains from between about 30% to about 70% Kraton®. Even more desirably, the first layer 12 contains at least about 40% Kraton®. Most desirably, the first layer 12 contains at least about 50% Kraton®.

The first layer 12 can be constructed to have a peel adhesion, also known as peel strength. By "peel adhesion" it is meant a measure of the average force needed to separate two bonded materials, like tape, labels, textile or plastic films. The peel adhesion is calculated during a peel test at a constant speed rate by dividing the average force required during the test by the unit width of the bonded samples. Depending on materials, norms, products, etc., the tests can be done with different angles; 90° and 180° are commonly used. The peel adhesion of the first layer 12 can vary. The peel adhesion of the first layer 12 can be calculated using the American Society for Testing and Materials (ASTM) D3330-04, Method A—180° test. The sample width for peel testing was 1 inch wide. The Peak Load and the Average Peak Load is reported in Newtons (N) and relates to the 1 inch wide sample. The Peel Strength (adhesion) is calculated by dividing the Average Peak Load by 25.

Five samples of the first layer 12 of the reusable, non-adhesive protective cover 10 were tested for peel adhesion. The results were as follows:

| | Peak Load (N) | Average Peak Load (N) | Peel Strength (N/mm) |
|---|---|---|---|
| Sample No. | | | |
| 1 | 4.488 | 1.600 | 0.064 |
| 2 | 3.808 | 1.789 | 0.072 |
| 3 | 5.467 | 1.589 | 0.064 |
| 4 | 7.898 | 2.667 | 0.107 |
| 5 | 3.497 | 1.448 | 0.058 |
| Summary: | | | |
| Minimum: | 3.497 | 1.448 | 0.058 |
| Maximum: | 7.898 | 2.667 | 0.107 |
| Average: | 5.032 | 1.819 | 0.073 |
| Std. Dev. | 1.772 | 0.490 | 0.02 |

These test results show that the 180 degree peel strength needed to remove the first layer 12 from stainless steel was at least about 0.04 Newtons/mm. Desirably, the Peak strength needed to remove the first layer 12 from stainless steel was at least about 0.05 Newtons/mm. The Average Peak Load needed to remove the first layer 12 from stainless steel was at least about 3.4 Newtons. Desirably, the Average Peak Load needed to remove the first layer 12 from stainless steel was at least about 5 Newtons.

Five samples of Duct (joint) tape attached to the exterior layer 22 of the second layer 14 of the reusable, non-adhesive protective cover 10 were also tested for peel adhesion. The results were as follows:

| | Peak Load (N) | Average Peak Load (N) | Peel Strength (N/mm) |
|---|---|---|---|
| Sample No. | | | |
| 6 | 0.137 | 6.786 | 3.413 |
| 7 | 0.234 | 10.860 | 5.852 |
| 8 | 0.161 | 8.418 | 4.020 |
| 9 | 0.163 | 8.320 | 4.072 |
| 10 | 0.156 | 9.186 | 3.903 |
| Summary: | | | |
| Minimum: | 0.137 | 6.786 | 3.413 |
| Maximum: | 0.234 | 10.860 | 5.852 |
| Average: | 0.170 | 8.714 | 4.252 |
| Std. Dev. | 0.037 | 1.482 | 0.932 |

These test results show that the 180 degree Peel adhesion needed to remove the Duct (joint) tape from the exterior surface 22 of the second layer 14 were at least about 0.12 N/mm. Desirably, the 180 degree Peel adhesion needed to remove the Duct (joint) tape from the exterior surface 22 of the second layer 14 was at least about 0.13 N/mm. These test results also show that the Peak Load needed to remove the Duct (joint) tape from the exterior surface 22 of the second layer 14 were at least about 6.7 Newtons. The Average Peak Load needed to remove the Duct (joint) tape from the exterior surface 22 of the second layer 14 were at least about 8 Newtons. Desirably, the Average Peak Load needed to remove the Duct (joint) tape from the exterior surface 22 of the second layer 14 was at least about 8.5 Newtons.

These test results show that the Peak Load needed to remove the Duct (joint) from the exterior surface 22 of the second layer 14 were at least about 6.7 Newtons. The Average Peak Load needed to remove the Duct (joint) tape from the exterior surface 22 of the second layer 14 was at least about 8 Newtons. Desirably, the Average Peak Load needed to remove the Duct (joint) tape from the exterior surface 22 of the second layer 14 was at least about 8.5 Newtons.

By "peel adhesion" it is meant a measure of the average force needed to separate two bonded materials. The force needed to tear the reusable, non-adhesive protective cover 10 is higher than the measured Maximum Peak Load. Desirably, the force needed to tear the reusable, non-adhesive protective cover 10 is well above the Maximum Peak Load.

A "Tear Propagation Resistance Test" was performed on all ten samples according to ASTM D1938-14. Three (3) thickness measurements were taken in the center of each sample. These three measurements were averaged and the average value used as the sample thickness for conducting the test.

The test samples were installed between two grips and a crosshead rate of 250 millimeters per minute was used to tear the samples at the notches. The initiation load, peak load, average load, and extension at peak load were recorded. The results are shown below:

| Sample No's | Designation | Avg. Initiation Load (N) | Avg. Peak Load (N) | Avg. Of Avg. Load (N) | Avg. Ext. at Peak Load (mm) |
|---|---|---|---|---|---|
| 1-5 | Machine Direction | 31.74 | 54.58 | 33.61 | 88.12 |
| 6-10 | Transverse Direction | 32.69 | 58.86 | 35.90 | 91.65 |

The test data showed the following for 'Machine Direction'—samples 1-5, and "Transverse Direction"—samples 6-10.

| | Machine Direction | | | | | | | |
|---|---|---|---|---|---|---|---|---|
| Sample | Thickness (mm) | | | | Average Load (N) | Initial Tear Load (N) | Peak Load (N) | Extension at Peak Load (N) |
| No. | 1st | 2nd | 3rd | Average | | | | |
| 1 | 0.880 | 0.860 | 0.915 | 0.885 | 31.60 | 38.47 | 46.11 | 84.48 |
| 2 | 0.887 | 0.907 | 0.877 | 0.890 | 35.77 | 36.98 | 58.24 | 97.17 |
| 3 | 0.940 | 0.841 | 0.927 | 0.903 | 36.70 | 26.10 | 55.49 | 97.58 |
| 4 | 0.897 | 0.860 | 0.903 | 0.887 | 32.51 | 26.25 | 69.37 | 102.8 |
| 5 | 0.885 | 0.905 | 0.881 | 0.890 | 31.47 | 30.73 | 43.68 | 58.59 |
| Minimum: | | | | 0.885 | 31.47 | 26.10 | 43.68 | 58.59 |
| Maximum: | | | | 0.903 | 36.70 | 38.47 | 69.37 | 102.8 |
| Average: | | | | 0.891 | 33.61 | 31.71 | 54.58 | 88.12 |
| Std. Dev. | | | | 0.007 | 2.450 | 5.820 | 10.29 | 17.83 |

| | Transverse Direction | | | | | | | |
|---|---|---|---|---|---|---|---|---|
| Sample | Thickness (mm) | | | | Average Load (N) | Initial Tear Load (N) | Peak Load (N) | Extension at Peak Load (N) |
| No. | 1st | 2nd | 3rd | Average | | | | |
| 6 | 0.905 | 0.937 | 0.889 | 0.910 | 33.06 | 30.50 | 54.71 | 88.38 |
| 7 | 0.891 | 0.914 | 0.936 | 0.914 | 40.23 | 33.68 | 62.11 | 88.62 |
| 8 | 0.896 | 0.932 | 0.925 | 0.918 | 31.35 | 31.77 | 46.19 | 63.56 |
| 9 | 0.940 | 0.936 | 0.906 | 0.927 | 44.81 | 42.65 | 78.87 | 116.4 |
| 10 | 0.951 | 0.903 | 0.933 | 0.929 | 30.04 | 24.87 | 52.41 | 101.3 |
| Minimum: | | | | 0.910 | 30.04 | 24.87 | 46.19 | 63.56 |
| Maximum: | | | | 0.929 | 44.81 | 42.65 | 78.87 | 116.4 |
| Average: | | | | 0.920 | 35.90 | 32.69 | 58.86 | 91.65 |
| Std. Dev. | | | | 0.008 | 6.350 | 6.460 | 12.55 | 19.46 |

For the "Machine Direction", the Average Peak Load was 54.58 Newtons, and for the "Transverse Direction" the Average Peak Load was 58.86 Newtons, To minimize the possibility of tearing the film when removing Duct (joint) tape preferably, the tear propagation average initiation load should be at least 2 times the Average Peak Load needed to remove the Duct (joint) tape from the exterior surface 22 of the second layer 14, or 2×8.714=17.4 N. More preferably, the tear propagation average initiation load should be at least 2.5 times the Average Peak load needed to remove the Duct (joint) tape from the exterior surface 22 of the second layer 14, or 2.5×8.714=21.8 N, Most preferably, the tear propagation average initiation load should be at least 3 times the Average Peak Load needed to remove the Duct (joint) tape from the exterior surface 22 of the second layer 14, or 3×8.714=26.1 N.

Stated another way, the protective cover 10 has a tear propagation initial load which is higher than the peak load.

Still referring to FIGS. 1 and 2, the first and second layers, 12 and 14 respectively, can also contain a colorant (not shown). The use of a colorant is optional, Various colorants are commercially available from a number of vendors, One such colorant is 16572 Blue available from Ampacet Corporation, 660 White Plains Road, Tarrytown, N.Y. 10591. Generally, less than about 3% of the composition of each of the first and second layers, 12 and 14 respectively, is made up of the colorant. Desirably, the colorant in each of the first and second layers, 12 and 14 respectively, ranges from between about 0.5% to about 1.75%. More desirably, the colorant in each of the first and second layers, 12 and 14 respectively, ranges from between about 0.75% to about 1.6%. Even more desirably, the colorant in each of the first and second layers, 12 and 14 respectively, ranges from between about 0.8% to about 1.5%. Most desirably, less than about 1% of the composition of each of the first and second layers, 12 and 14 respectively, is made up of the colorant.

The first layer 12 has the ability to stay in place during use. It is made to contact the surface of the structure or object that needs to be protected. The first layer 12 can have a moderate to a high static coefficient of friction (SCOF) value to assure that it stays in place and is slip resistant. The first layer 12 is also capable of being rinsed, washed or refreshed after each use. Since the first layer 12 is formed from a film, it can be rinsed with water to remove any contaminants that may have come in contact with it. When the first layer 12 is formed from metallocene-catalyzed polyolefin polymers, ethylene copolymers and/or styrenic block copolymers, washing will quickly remove any contaminates.

It should be understood that the composition of the first layer 12 can vary. Normally, the first layer 12 will include from about 10% to about 30% of a polymer; from about 50 to about 80% of a chemical to increase SCOF, such as Kraton®; from about 10% to about 15% of a flame retardant, such as Extensity 0201-127; and from about 0.5% to about 3% of a colorant. When the polymer is a copolymer, the composition of the two components can be equal or can vary. Normally, the composition of a copolymer will vary. For example, a copolymer can include about 60% to about 95% of low density polyethylene and from about 5% to about 40% of linear low density polyethylene.

In one example, the first layer 12 can include about 18% polyethylene, about 70% Kraton MD6666GO, from about 10% to about 15% of a flame retardant, and from about 0.5% to about 2% of a colorant.

By varying the composition of the polymer, copolymer or homopolymer used in the first layer 12, and by varying the additional chemical or substances added to the first layer 12, such as Kraton® and Extensity 0201-127, one can alter the static coefficient of friction (SCOF) and peel adhesion of the reusable, non-adhesive protective cover 10, For example, certain grades of metallocene-catalyzed polymers deliver a high static coefficient of friction (SCOF) with little or no peel adhesion. Kraton MD6741 produces a film with a high static coefficient of friction (SCOF) and a low level of peel adhesion, Kraton MD6748 produces a film with a high level of a static coefficient of friction (SCOF) and a high level of peel adhesion. Therefore, it is possible to adjust the composition of the first layer 12 to deliver the desired static coefficient of friction (SCOF) and peel adhesion needed for a particular job.

Still referring to FIGS. 1 and 2, the second layer 14 of the reusable, non-adhesive protective cover 10 is also formed from a polymer; copolymer or homopolymer. The second layer 14 can use the same or a different polymer, copolymer or homopolymer as was used to create the first layer 12. The second layer 14 does not have to have a moderate or high static coefficient of friction (SCOF) value and therefore no chemical or substance, such as Kraton®, has to be added to the second layer 14. The second layer 14 does have from about 10% to about 15% of a flame retardant, Like in the first layer 12, a flame retardant such as Extensity 0201-127 can be added to the second layer 14 to make it flame retardant. The second layer 14 is also water proof or water resistant since it is made from a thermoplastic material. The second layer 14 can be glossy, if desired. By "glossy" it is meant having a smooth shiny lustrous surface, A glossmeter (also gloss meter) is an instrument which is used to measure specular reflection gloss of a surface. Gloss is determined by projecting a beam of light at a fixed intensity and angle onto a surface and measuring the amount of reflected light at an equal but opposite angle. The measurement results of a glossmeter are related to the amount of reflected light from a black glass standard with a defined refractive index, and not to the amount of incident light. The measurement value for this defined standard is equal to 100 gloss units (calibration). Materials with a higher refractive index can have a measurement value above 100 gloss units (GU), e.g. films. In case of transparent materials, the measurement value can be increased due to multiple reflections in the bulk of the material. The exterior surface 22 of the second layer 14 can have a gloss refractive index of greater than about 100 gloss units.

The second layer 14 can make up at least about 50% of the basis weight of the reusable, non-adhesive protective cover 10. Desirably, the second layer 14 can make up at least about 60% of the basis weight of the reusable, non-adhesive protective cover 10. More desirably, the second layer 14 can make up at least about 70% of the basis weight of the reusable, non-adhesive protective cover 10.

Referring again to FIGS. 1 and 2, the thickness $t_2$ of the second layer 14 is generally greater than the thickness $t_1$ of the first layer 12. As depicted, the thickness $t_2$ of the second layer 14 is at least about two times the thickness $t_1$ of the first layer 12. Desirably, the thickness $t_2$ of the second layer 14 is at least about three times the thickness $t_1$ of the first layer 12.

The surface energy of the exterior surface 22 of the second layer 14 should be such that it allows proper release from a joint tape, such as Duct tape, without damaging the reusable, non-adhesive protective cover 10 while at the same time providing a waterproof attachment to adjacent sheets of the reusable, non-adhesive protective cover 10. The low surface energy of the exterior surface 22 of the second layer 14 reduces the wetting out or attraction of the Duct (joint) tape adhesive to the exterior surface 22. Desirably, the exterior surface 22 of the second layer 14 has a surface energy of less than about 45 dynes/cm, More desirably, the exterior surface 22 of the second layer 14 has a surface energy of less than about 40 dynes/cm. Even more desirably, the exterior surface 22 of the second layer 14 has a surface energy of less than about 35 dynes/cm. Surface energy is determined by the use of dyne test pens, such Accu Dyne test pens, made by Diversified Enterprises, 101 Mulberry Street, Suite 2N, Claremont, N.H. 03743.

The reusable, non-adhesive protective cover 10 has a predetermined basis weight and the second layer 14 can make up at least about 70% of the basis weight of the reusable, non-adhesive protective cover 10. Desirably, the second layer 14 can make up at least about 75% of the basis weight of the reusable, non-adhesive protective cover 10. More desirably, the second layer 14 can make up at least about 80% of the basis weight of the reusable, non-adhesive protective cover 10.

As the percent of the basis weight of the reusable, non-adhesive protective cover 10 that comes from the second layer 14 increases, the cost of the first layer 12 decreases because the cost of the Kraton® film in the first layer 12 is significantly more costly than the cost of the polymers (polyethylene) used to form the second layer 14. For example, if the weight of a section of the reusable, non-adhesive protective cover 10 is 10 pounds, and the polymers in the second layer 14 weigh 7 pounds, at a cost of $0.20 per pound, then the cost of the second layer 14 is (7×$0,20)=$1.40. The weight of the first layer 12 is 3 pounds and the cost of the polymers in the first layer 14 is $1.00 per pound (3×1.00)=$3.00. Therefore, the total cost of the 10 pound sample of the reusable, non-adhesive protective cover 10 is ($1,40+$3,00)=$4.40, Whereas, if the second layer 14 of a 10 pound sample of a non-adhesive protective cover 10 weighs 8 pounds, then the cost of the second layer 14 is (8×$0.20)=$1.60. The weight of the first layer 12 is 2 pounds and the cost of the polymer in the first layer 12 is $1.00 per pound (2×$1,00)=$2.00, Therefore, the total cost of the 10 pound sample of the reusable, non-adhesive protective cover 10 is (1.60+$2.00)=$3.60.

The composition of the second layer 14 should also exhibit "attachment and release" capabilities such that a joint tape (not shown) can be used to join adjacent sheets of the reusable, non-adhesive protective cover 10 together. The joint tape can vary in construction. The joint tape can be a Duct type tape having a predetermined peel adhesion value. 3M Company having an office at 3M Center Building 220 in Saint Paul, Minn. 55144 is one company that sells a number of different kinds of Duct (joint) tapes. Three such Duct (joint) tapes from 3M Company are numbers: 3903, 3939 and 6969. Each has a specific peel adhesion value calculated according to the American Society for Testing and Materials (ASTM)—D3330, The tape 3903 has an adhesion to steel of 16 ounces/inch width; the tape 3939 has an adhesion to steel of 55 ounces/inch width; and the tape 6969 has an adhesion to steel of 51 ounces/inch width. It is important that the Duct (joint) tape can be adhered to the exterior surface 22 of the second layer 14 and be later removed from the second layer 14 without damaging the reusable, non-adhesive protective cover 10, Desirably, the reusable, non-adhesive protective cover 10 will not tear as the Duct (joint) tape is removed.

It should be understood that achieving the proper surface energy in the exterior surface 22 of the second layer 14 is an important factor in achieving proper adhesion when joining two adjacent sheets of the reusable, non-adhesive protective covers 10, 10 together. Two or more sheets of the reusable, non-adhesive protective cover 10, 10 may be joined together in order to cover a larger area. A joint tape, such as Duct tape, can be used to secure two or more sheets of the reusable, non-adhesive protective cover 10, 10 together. If the surface energy of the exterior surface 22 of the second layer 14 is too low, and the surface energy of the Duct (joint) tape is not high enough to compensate, the Duct (joint) tape will not adhere properly to the exterior surface 22 of the second layer 14. If the surface energy of the exterior surface 22 of the second layer 14 is too high, and the surface energy of the Duct (joint) tape is not lowered enough to compensate, the Duct (joint) tape will not release properly from the exterior surface 22 and this may result in tearing the reusable, non-adhesive protective cover 10. A proper balance of surface energy between the exterior surface 22 of the second layer 14 and the Duct (joint) tape adhesive surface will ensure that the Duct (joint) tape can be removed without damaging the reusable, non-adhesive protective cover 10.

Another factor which can improve the usable life of the reusable, non-adhesive protective cover 10 is the "tear resistance" of the thermoplastic film from which the second layer 14 is constructed. By "tear resistance" it is meant how well a material can withstand the effects of tearing. More specifically, it is how well a material resists the growth of any cuts when under tension, it is usually measured in kN/m. The thermoplastic film forming the second layer 14 must have a "tear resistance" which is at least as high as the "peel adhesion" of the Duct (joint) tape to the reusable, non-adhesive protective cover 10, By "peel adhesion" it is meant the force required to remove a joint tape, such as Duct tape, from a test panel, such as the exterior surface 22 of the second layer 14 of the reusable, non-adhesive protective cover 10, The peel adhesion test is performed according to the ASTM D3330-04 (2010) test procedure. The Peak Load of Duct (joint) tape attached to the exterior surface 22 of the second layer 14 should be at least about 6.7 Newtons and the Average Peak Load should be at least about 8 Newtons.

It should be understood that the reusable, non-adhesive protective cover 10, 10', 10" and 11 can be formed such that the exterior surface 18 of the first layer 12 and the exterior surface 22 of the second layer 14 can be planar. Alternatively, the reusable, non-adhesive protective cover 10, 10', 10" and 11 could be formed such that the exterior surface 18 of the first layer 12 contains a plurality of indentations 52 and the exterior surface 22 of the second layer 14 contains a plurality of protrusions 54, see FIG. 10.

It should also be understood that the exteriors surfaces, 18 and 22 respectively, of the reusable, non-adhesive protective cover 10, 10', 10" and 11 are washable. By "washable" it is meant that the thermoplastic film is washable with water. Desirably, the reusable, non-adhesive protective cover 10, 10', 10" and 11 can be constructed to be leakproof, waterproof or water resistant. By "leakproof" it is meant water cannot pass through it. By "waterproof" it is meant that the protective cover 10, 10', 10" and 11 are impervious to or unaffected by water, By "water resistant" it is meant that the protective cover 10, 10', 10", and 11 are water repellent.

Referring now to FIGS. 3 and 4, a reusable, non-adhesive protective cover 10' is shown that includes three layers. The three layers include a first layer 12, a second layer 14 and a third or middle layer 26. The third or middle layer 26 is positioned between the first and second layers, 12 and 14 respectively. The third or middle layer 26 contacts the interior surface 16 of the first layer 12 and the interior surface 20 of the second layer 14, The third or middle layer 26 can be formed from the same material or from a different material as was used to create the first and/or second layers, 12 or 14 respectively. The third or middle layer 26 could be formed from a polymer, a copolymer or a homopolymer. The third or middle layer 26 does not have to have a moderate or high static coefficient of friction (SCOF) value and therefore no chemical or substance, such as Kraton®, has to be added to the third or middle layer 26. The third or middle layer 26 can contain a flame retardant, if desired. The presence of a flame retardant is optional. When a flame retardant is desired, Extensity 0201-127 or some other flame retardant chemical or substance can be added to the third or middle layer 26. The amount of a flame retardant that can be added to the third or middle layer 26 can vary. Normally, at least about 5% of a flame retardant can be added to the third or middle layer 26. Desirably, at least about 8% of a flame retardant can be added to the third or middle layer 26. More desirably, at least about 10% of a flame retardant can be added to the third or middle layer 26, Even more desirably, at least about 12% of a flame retardant can be added to the third or middle layer 26, Most desirably, from between about 5% to about 20% of a flame retardant can be added to the third or middle layer 26.

It should be understood that usually the thinner a layer is, the higher percent of a flame retardant it can contain. For example, a layer having a thickness of about 6 mils may contain about 20% of the flame retardant, while a layer having a thickness of about 35 mils may contain from between about 5% to about 15% of a flame retardant.

The third or middle layer 26 has a thickness $t_3$, see FIG. 4, which can vary in dimension. The thickness $t_3$ of the third or middle layer 26 can be less than, equal to, or be greater than either of the thicknesses $t_1$ or $t_2$ of the first or second layers, 12 or 14 respectively, Normally, the thickness $t_3$ of the third or middle layer 26 is greater than either of the thicknesses $t_1$ or $t_2$ of the first or second layers, 12 or 14 respectively. The thickness $t_3$ of the third or middle layer 26 can range from between about 1 mil to about 30 mils, Desirably, the thickness $t_3$ of the third or middle layer 26 is greater than about 5 mils, More desirably, the thickness $t_3$ of the third or middle layer 26 is greater than about 10 mils. Even more desirably, the thickness $t_3$ of the third or middle layer 26 is greater than about 20 mils. Most desirably, the thickness $t_3$ of the third or middle layer 26 is less than about 30 mils.

The third or middle layer 26 can be formed from any polymer, copolymer, homopolymer or from any other material known to those skilled in the art. The third or middle layer 26 can be made from a low cost material, such as a recycled polymer, to reduce the total cost of the reusable, non-adhesive protective cover 10'. The third or middle layer 26 can also be made from a low basis weight material. Alternatively, the third or middle layer 26 can be foam. One such foam is formed from polyethylene, which will increase the overall thickness of the reusable, non-adhesive protective cover 10' while keeping the overall basis weight low. Normally, as one reduces the overall basis weight of the reusable, non-adhesive protective cover 10', one reduces the cost to manufacture the reusable, non-adhesive protective cover 10'.

Referring again to FIG. 4, the first layer 12 can form about 20% of the overall thickness of the reusable, non-adhesive protective cover 10', the second layer 14 can form about 30% of the overall thickness of the reusable, non-adhesive protective cover 10', and the third layer 26 can form about 50% of the overall thickness of the reusable, non-adhesive protective cover 10'.

Still referring to FIGS. 3 and 4, the reusable, non-adhesive protective cover 10' is similar to the reusable, non-adhesive protective cover 10, shown in FIGS. 1 and 2, except that it has three layers 12, 14 and 26, instead of the two layers 12 and 14. The reusable, non-adhesive protective cover 10' is also shown as a rectangular sheet having a longitudinal central axis X-X, a vertical central axis Y-Y and a transverse central axis Z-Z. Although depicted as a rectangular sheet, the reusable, non-adhesive protective cover 10' could be manufactured in a variety of geometrical shapes, including, but not limited to: a square, a circle, a triangle, etc.

In the reusable, non-adhesive protective cover 10', the exterior surface 18 of the first layer 12 is designed to contact a structure or object and is sometimes referred to as the "contact surface", The exterior surface 22 of the second layer 14 is spaced away from the structure or object which is to be covered and is sometimes referred to as the "non-contact surface".

The third or middle layer 26 can also contain a colorant, if desired. When desired, from between about 0.5% to about 3% of a colorant can be added to the third or middle layer 26.

The third or middle layer 26 can have a basis weight which varies. The basis weight of the third or middle layer 26 can range from between about 40% to about 60% of the total basis weight of the reusable, non-adhesive protective cover 10'. Desirably, the basis weight of the third or middle layer 26 can range from between about 45% to about 55% of the total basis weight of the reusable, non-adhesive protective cover 10'. More desirably, the basis weight of the third or middle layer 26 is about 50% of the total basis weight of the reusable, non-adhesive protective cover 10'.

The following Tables 1 and 2 will be explained with reference to different embodiments of a reusable, non-adhesive protective cover 10 and 10'.

TABLE 1

A FILM COMPOSITION FOR A TWO LAYER FILM

| FILM THICKNESS (INCHES) | HIGH COF BOTTOM LAYER | | | | | | LOW COF TOP LAYER | | | | |
|---|---|---|---|---|---|---|---|---|---|---|---|
| | % OF TOTAL FILM BASIS WGT | LDPE | LLDPE | Hydrogenated Sytrenic Block Copolymer | Flame Retardant | COLOR | % OF TOTAL FILM BASIS WGT | LDPE | LLDPE | Flame Retardant | COLOR |
| 0.005 | 20% | 20.00% | 0.00% | 70.00% | 10.00% | 0.00% | 80% | 76% | 10% | 10% | 3% |
| 0.01 | 20% | 18.00% | 0.00% | 70.00% | 12.00% | 0.00% | 80% | 79% | 10% | 10% | 1% |
| 0.02 | 15% | 18.00% | 0.00% | 70.00% | 12.00% | 0.00% | 85% | 79% | 10% | 10% | 1% |
| 0.04 | 15% | 18.00% | 0.00% | 70.00% | 12.00% | 0.00% | 85% | 79% | 10% | 10% | 1% |
| 0.06 | 10% | 18.00% | 0.00% | 70.00% | 12.00% | 0.00% | 90% | 79% | 10% | 10% | 1% |

TABLE 2

A FILM COMPOSITION FOR A THREE LAYER FILM

| FILM THICKNESS (INCHES) | HIGH COF BOTTOM LAYER | | | | | | MIDDLE LAYER | | |
|---|---|---|---|---|---|---|---|---|---|
| | % OF TOTAL FILM BASIS WGT | LDPE | LLDPE | Hydrogenated Sytrenic Block Copolymer | Flame Retardant | COLOR | % OF TOTAL FILM BASIS WGT | LDPE | LLDPE |
| 0.005 | 20% | 20.00% | 0.00% | 70.00% | 10.00% | 0.00% | 50% | 32% | 15% |
| 0.01 | 20% | 18.00% | 0.00% | 70.00% | 12.00% | 0.00% | 50% | 34% | 15% |
| 0.02 | 15% | 18.00% | 0.00% | 70.00% | 12.00% | 0.00% | 50% | 34% | 15% |
| 0.04 | 15% | 18.00% | 0.00% | 70.00% | 12.00% | 0.00% | 50% | 34% | 15% |
| 0.06 | 10% | 18.00% | 0.00% | 70.00% | 12.00% | 0.00% | 50% | 34% | 15% |

| FILM THICKNESS (INCHES) | MIDDLE LAYER | | | LOW COF TOP LAYER | | | | |
|---|---|---|---|---|---|---|---|---|
| | Recycled Content | Flame Retardant | COLOR | % OF TOTAL FILM BASIS WGT | LDPE | LLDPE | Flame Retardant | COLOR |
| 0.005 | 40% | 10% | 3% | 30% | 72% | 10% | 15% | 3% |
| 0.01 | 40% | 10% | 1% | 30% | 74% | 10% | 15% | 1% |
| 0.02 | 40% | 10% | 1% | 35% | 74% | 10% | 15% | 1% |
| 0.04 | 40% | 10% | 1% | 35% | 74% | 10% | 15% | 1% |
| 0.06 | 40% | 10% | 1% | 40% | 74% | 10% | 15% | 1% |

Referring now to FIGS. 5 and 6, a reusable, non-adhesive protective cover 10' is shown that includes four layers. The four layers include a first layer 12, a second layer 14, a third layer 26 and a fourth layer 28. The third and fourth layers, 26 and 28 respectively, are positioned between the first and second layers, 12 and 14 respectively. A surface of the third layer 26 contacts the interior surface 16 of the first layer 12 and a surface of the fourth layer 28 contacts the interior surface 20 of the second layer 14. The third and fourth layers, 26 and 28 respectively, can be formed from the same or a different material, i.e, polymer, copolymer or homopolymer, as was used to create either of the first or second layers, 12 or 14 respectively. The third and fourth layers, 26 and 28 respectively, do not have to have a moderate or high static coefficient of friction (SCOF) value and therefore no chemical or substance, such as Kraton®, has to be added to either of the third or fourth layers, 26 or 28 respectively. The third and/or fourth layers, 26 and/or 28 respectively, can contain a flame retardant, if desired. The presence of a flame retardant is optional. When a flame retardant is desired, Extensity 0201-127 or some other flame retardant chemical or substance can be added to the third and/or fourth layers 26 and/or 28 respectively. The amount of the flame retardant that is added can vary. Normally, at least about 5% of a flame retardant can be added to either of the third and/or fourth layers 26 and/or 28 respectively. Desirably, at least about 8% of a flame retardant can be added to either of the third and/or fourth layers 26 and/or 28 respectively. More desirably, at least about 10% of a flame retardant can be added to either of the third and/or fourth layers 26 and/or 28 respectively. Even more desirably, at least about 12% of a flame retardant can be added to either of the third and/or fourth layers 26 and/or 28 respectively. Most desirably, either of the third and/or fourth layers, 26 and/or 28 respectively, can contain from between about 5% to about 20% of a flame retardant.

The third layer 26 has a thickness $t_3$ and the fourth layer 28 has a thickness $t_4$, see FIG. 6. Both of the thicknesses $t_3$ and $t_4$ can vary in dimension. The thicknesses $t_3$ and $t_4$ of the third and fourth layers, 26 and 28 respectively, can be less than, equal to or be greater than either of the thicknesses $t_1$ or $t_2$ of the first or second layers, 12 or 14 respectively. Normally, both of the thicknesses $t_3$ and $t_4$ are greater than either of the thicknesses $t_1$ or $t_2$ of the first or second layers, 12 or 14 respectively. Each of the thicknesses $t_3$ and $t_4$ can range from between about 5 mils to about 60 mils (about 0.005 inches to about 0.060 inches). Desirably, each of the thicknesses $t_3$ and $t_4$ is greater than about 5 mils. More desirably, each of the thicknesses $t_3$ and $t_4$ ranges from between about 6 mils to about 50 mils. Even more desirably, each of the thicknesses $t_3$ and $t_1$ ranges from between about 6 mils to about 30 mils. Most desirably, each of the thicknesses $t_3$ and $t_4$ is less than about 30 mils.

Stated another way, the combined thickness of the third and fourth layers, 26 and 28 respectively, can be about 50% of the total thickness of the reusable, non-adhesive protective cover 10". Desirably, each of the third and fourth layers, 26 and 28 respectively, is about 25% of the total thickness of the reusable, non-adhesive protective cover 10".

The third and/or fourth layers, 26 and/or 28 respectively, can be formed from any polymer, copolymer, homopolymer or from any other material known to those skilled in the art. The third and/or fourth layers, 26 and/or 28 respectively, can be made from a low cost material, such as a recycled polymer, to reduce the total cost of the reusable, non-adhesive protective cover 10". Alternatively, the third and/or fourth layers, 26 and/or 28 respectively, can be foam. One such foam is formed from polyethylene, which will increase the overall thickness of the reusable, non-adhesive protective cover 10" while keeping the overall basis weight low. Normally, as one reduces the overall basis weight of the reusable, non-adhesive protective cover 10", one reduces the cost to manufacture the reusable, non-adhesive protective cover 10".

The reusable, non-adhesive protective cover 10" is similar to the reusable, non-adhesive protective cover 10', shown in FIGS. 3 and 4, except that it has four layers 12, 14, 26 and 28, instead of the three layers 12, 14 and 26. The reusable, non-adhesive protective cover 10" is also shown as a rectangular sheet having a longitudinal central axis X-X, a vertical central axis Y-Y and a transverse central axis Z-Z. Although depicted as a rectangular sheet, the reusable, non-adhesive protective cover 10" could be manufactured in a variety of geometrical shapes, including, but not limited to: a square, a circle, a triangle, etc.

In the reusable, non-adhesive protective cover 10", the exterior surface 18 of the first layer 12 is designed to contact a structure or object and is sometimes referred to as the "contact surface". The exterior surface 22 of the second layer 14 is spaced away from the structure or object which is to be covered and is sometimes referred to as the "non-contact surface".

The third and/or fourth layers, 26 and/or 28 respectively, can also contain a colorant if desired. When desired, from between about 0.5% to about 3% of a colorant can be added to either of the third or fourth layers, 26 and 28 respectively.

Figure 8:
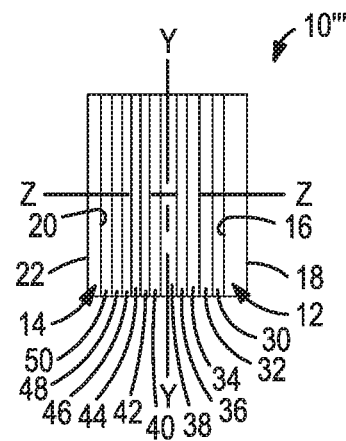
FIG. 8 is a side view of the thirteen layer reusable, non-adhesive protective cover shown in FIG. 7.

Referring now to FIGS. 7 and 8, a reusable, non-adhesive protective cover 10''' is shown that includes a total of thirteen layers. The thirteen layers include a first layer 12, a second layer 14, and eleven inner layers 30, 32, 34, 36, 38, 40, 42, 44, 46, 48 and 50 positioned between the first and second layers, 12 and 14 respectively. A surface of the layer 30 contacts the interior surface 16 of the first layer 12 and a surface of the layer 50 contacts the interior surface 20 of the second layer 14.

It should be understood that from between two to eleven inner layers can be positioned between the first and second layers, 12 and 14 respectively.

The eleven inner layers 30, 32, 34, 36, 38, 40, 42, 44, 46, 48 and 50 can be formed from the same or a different material, i.e. polymer, copolymer or homopolymer, as was used to create either of the first or second layers, 12 or 14 respectively. None of the eleven inner layers 30, 32, 34, 36, 38, 40, 42, 44, 46, 48 and 50 has to have a moderate or high static coefficient of friction (SCOF) value and therefore no chemical or substance, such as Kraton®, has to be added to any of these layers. Each of the eleven inner layers 30, 32, 34, 36, 38, 40, 42, 44, 46, 48 and 50 can contain a flame retardant, if desired. The presence of a flame retardant is optional. When a flame retardant is desired, Extensity 0201-127 or some other flame retardant chemical or substance can be added to one or more of the eleven inner layers 30, 32, 34, 36, 38, 40, 42, 44, 46, 48 and 50. Desirably, a flame retardant can be added to any or all of the eleven inner layers 30, 32, 34, 36, 38, 40, 42, 44, 46, 48 and 50. The amount of the flame retardant that is added can vary. Normally, at least about 5% of a flame retardant can be added to one or more of the eleven inner layers 30, 32, 34, 36, 38, 40, 42, 44, 46, 48 and 50, Desirably, at least about 8% of a flame retardant can be added to one or more of the eleven inner layers 30, 32, 34, 36, 38, 40, 42, 44, 46, 48 and 50. More desirably, at least about 10% of a flame retardant can be added to one or more of the eleven inner layers 30, 32, 34, 36, 38, 40, 42, 44, 46, 48 and 50. Even more desirably, at least about 12% of a flame retardant can be added to one or more of the eleven inner layers 30, 32, 34, 36, 38, 40, 42, 44, 46, 48 and 50. Most desirably, each of the two to eleven inner layers 30, 32, 34, 36, 38, 40, 42, 44, 46, 48 and 50 can contain from between about 5% to about 20% of a flame retardant.

The thickness (not designated) of each of the eleven inner layers 30, 32, 34, 36, 38, 40, 42, 44, 46, 48 and 50 can vary in dimension. The thickness of each of the eleven inner layers 30, 32, 34, 36, 38, 40, 42, 44, 46, 48 and 50 can be less than, equal to or be greater than either of the thicknesses $t_1$ or $t_2$ of the first or second layers, 12 or 14 respectively, Normally, the thickness of each of the eleven inner layers 30, 32, 34, 36, 38, 40, 42, 44, 46, 48 and 50 is equal to or greater than either of the thicknesses $t_1$ or $t_2$ of the first or second layers, 12 or 14 respectively. Each of the eleven inner layers 30, 32, 34, 36, 38, 40, 42, 44, 46, 48 and 50 can have a thickness which range from between about 2 mils to about 20 mils (about 0.002 inches to about 0.020 inches). Desirably, each of the eleven inner layers 30, 32, 34, 36, 38, 40, 42, 44, 46, 48 and 50 has a thickness greater than about 3 mils (about 0.003 inches). More desirably, each of the eleven inner layers 30, 32, 34, 36, 38, 40, 42, 44, 46, 48 and 50 has a thickness greater than about 5 mils (about 0.005 inches), Even more desirably, each of the eleven inner layers 30, 32, 34, 36, 38, 40, 42, 44, 46, 48 and 50 has a thickness greater than about 6 mils (about 0.006 inches). Most desirably, each of the eleven inner layers 30, 32, 34, 36, 38, 40, 42, 44, 46, 48 and 50 has a thickness greater than about 7 mils (about 0.007 inches).

Each of the one to eleven inner layers 30, 32, 34, 36, 38, 40, 42, 44, 46, 48 and 50 can be formed from any material, i.e. polymer, copolymer, homopolymer, or from any other material known to those skilled in the art. Each of the one to eleven inner layers 30, 32, 34, 36, 38, 40, 42, 44, 46, 48 and 50 can be made from a low cost material, such as a recycled polymer, to reduce the total cost of the reusable, non-adhesive protective cover 10''. Alternatively, one or more of the eleven inner layers 30, 32, 34, 36, 38, 40, 42, 44, 46, 48 and 50 can be foam. One such foam is formed from polyethylene, which will increase the overall thickness of the reusable, non-adhesive protective cover 10''' while keeping the overall basis weight low. Normally, as one reduces the overall basis weight of the reusable, non-adhesive protective cover 10''', one reduces the cost to manufacture the reusable, non-adhesive protective cover 10'''.

The reusable, non-adhesive protective cover 10''' is similar to the reusable, non-adhesive protective cover 10'', shown in FIGS. 5 and 6, except that it has thirteen layers 12, 14, 30, 32, 34, 36, 38, 40, 42, 44, 46, 48 and 50, instead of the four layers 12, 14, 26 and 28. The reusable, non-adhesive protective cover 10''' is also shown as a rectangular sheet having a longitudinal central axis X-X, a vertical central axis Y-Y and a transverse central axis Z-Z. Although depicted as a rectangular sheet, the reusable, non-adhesive protective cover 10''' could be manufactured in a variety of geometrical shapes, including, but not limited to: a square, a circle, a triangle, etc.

In the reusable, non-adhesive protective cover 10''', the exterior surface 18 of the first layer 12 is designed to contact a structure or object and is sometimes referred to as the "contact surface". The exterior surface 22 of the second layer 14 is spaced away from the structure or object which is to be covered and is sometimes referred to as the "non-contact surface".

The one to eleven inner layers 30, 32, 34, 36, 38, 40, 42, 44, 46, 48 and 50 can also contain a colorant, if desired. When desired, from about 0.5% to about 3% of a colorant can be added to any one or all of the eleven inner layers 30, 32, 34, 36, 38, 40, 42, 44, 46, 48 and 50.

Figure 9:
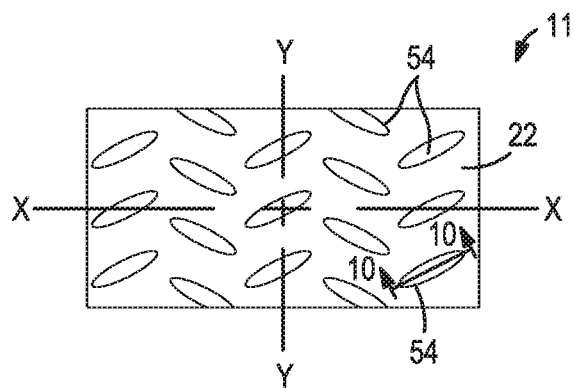
FIG. 9 is a top view of an embossed reusable, non-adhesive protective cover.
Figure 10:
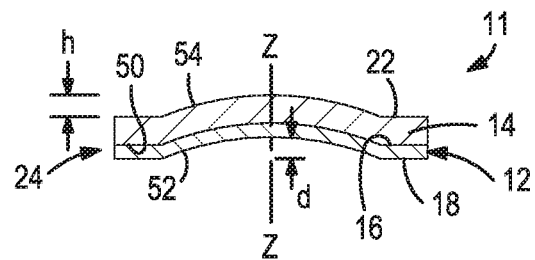
FIG. 10 is a cross-sectional view of one embossment formed in the reusable, non-adhesive protective cover taken along line 10-10.

Referring now to FIGS. 9 and 10, a reusable, non-adhesive protective cover 11 is shown. The reusable, non-adhesive protective cover 11 is similar to the reusable, non-adhesive protective cover 10, shown in FIGS. 1 and 2, except that it contains a plurality of indentations 52 in FIG. 10 and a plurality of protrusions 54. The plurality of indentations 52 appear in the exterior surface 18 of the first layer 12 and the plurality of protrusions 54 appear in the exterior surface 22 of the second layer 14. As depicted in FIG. 10, each of the indentations 52 is vertically aligned, parallel to the transverse central axis Z-Z with one of the plurality of protrusions 54. Each of the indentations 52 is a mirror image of each of the protrusions 54, The size, shape and configuration of each of the indentations 52 and protrusions 54 can vary. Each of the plurality of indentations 52 and each of the plurality of protrusions 54 can have almost any known geometrical shape or design. All of the plurality of indentations 52 can have an identical configuration or some of the indentations 52 can have a different configuration. Likewise, all of the plurality of protrusions 54 can have an identical configuration or some of the protrusions 54 can have a different configuration. In FIGS. 9 and 10, the plurality of protrusions 54 form a pattern. The pattern includes a plurality of elongated, narrow shapes with pointed ends. This pattern is commonly referred to by a variety of names such as: "diamond plate, checquer plate, tread plate or Durbar floor plate". This pattern appears as a series of raised diamonds or lines. This pattern is typically used on the steps of a fire truck, on stairways, etc.

Referring to FIG. 10, each of the indentations 52 has a depth d which extends into the reusable, non-adhesive protective cover 11. The depth d is measured from that portion of the exterior surface 18 of the first layer 12 that is planar to the bottom of the indentation 52. The depth d can vary in dimension. Likewise, each of the protrusions 54 has a height h which extends outward from the reusable, non-adhesive protective cover 11. The height h is measured from that portion of the exterior surface 22 of the second layer 14 that is planar to the top of the protrusion 54. The height h can vary in dimension. Generally, the depth d is equal to the height h. Both the depth d and the height h can range from between about 0.01 mil to about 5 mils. Desirably, both the depth d and the height h can range from between about 0.02 mils to about 3 mils. More desirably, both the depth d and the height h can range from between about 0.03 mils to about 2 mils. Even more desirably, both the depth d and the height h can range from between about 0.04 mils to about 1 mil. Most desirably, both the depth d and the height h can each exceed about 0.05 mils.

The plurality of protrusions 54 function to improve the slip resistance of the reusable, non-adhesive protective cover 11 when it is positioned over flooring which may be damp or wet. The raised areas of the plurality of protrusions 54 provide dry areas which prevent a person walking on the reusable, non-adhesive protective cover 11 from slipping. The plurality of protrusions 54 also facilitate the unwinding of a finished roll prior to use. The plurality of protrusions 54 actually prevent blocking of the roll of the reusable, non-adhesive protective cover 11.

Methods

Referring now to FIGS. 11-16, several methods of forming a reusable, non-adhesive protective cover 10, 11 or 11' will now be explained.

Figure 11:
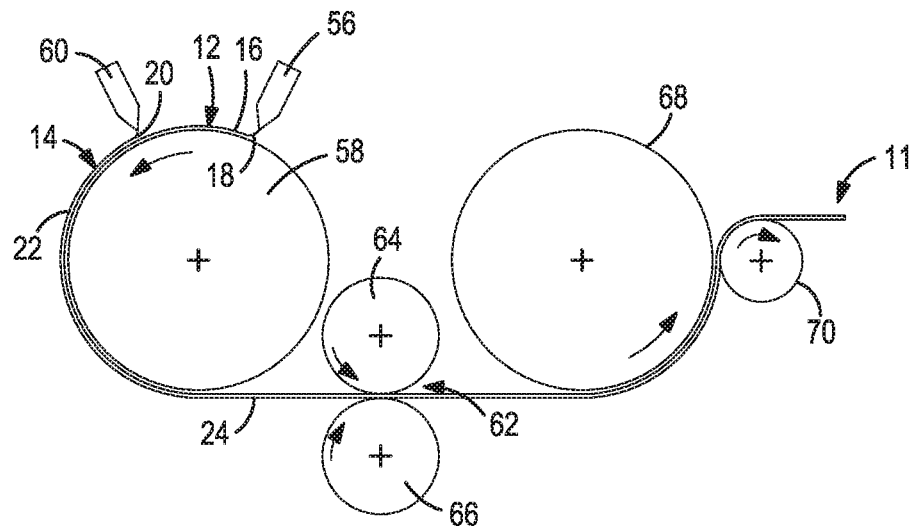
FIG. 11 is a schematic for making an embossed, coextruded film, non-adhesive protective cover.

Referring to FIG. 11, a method of forming a co-extruded embossed, reusable, non-adhesive protective cover 11 is shown. The method includes the steps of extruding a first layer 12 from a first extruder 56 onto a rotatable cast roll 58. The cast roll 58 rotates in a counterclockwise direction. The first layer 12 is a thermoplastic film formed from a polymer, copolymer, homopolymer, etc. For example, the first layer 12 could be a copolymer film of low density polyethylene and Kraton®. The first layer 12 has an interior surface 16 and an exterior surface 18. The first layer 12 contains from between about 5% to about 20% of a flame retardant (not shown). The first layer 12 has a static coefficient of friction (SCOF) of at least about 0.5. In one particular example, the first layer 12 contains from between about 18% to about 20% of low density polyethylene film, about 70% hydrogenated styrene block copolymer, and from between about 10% to about 12% of a flame retardant.

The method also includes extruding a second layer 14 from a second extruder 60 onto the interior surface 16 of the first layer 12 to form a co-extruded thermoplastic laminate 24. The second layer 14 is also a thermoplastic film formed from a polymer, copolymer, homopolymer, etc. For example, the second layer 14 could be a linear low density polyethylene film. In one particular example, the second layer 14 contains from between about 77% to about 79% of linear low density polyethylene film, about 10% of linear low density polyethylene, about 10% of a flame retardant, and from between about 1% to about 3% of a colorant.

The second layer 14 has an exterior surface 22 which exhibits "attachment and release" capabilities such that a Duct (joint) tape can be used to join adjacent sheets of the reusable, non-adhesive protective cover 11, 11 together. The second layer 14 contains from between about 5% to about 20% of a flame retardant.

The co-extruded laminate 24 is then advanced between a nip 62 formed by an embossing roll 64 and a rubber roll 66. The embossing roll 64 is rotated in a clockwise direction and the rubber roll 66 is rotated in a counter clockwise direction. The nip 62 can be sized to allow the reusable, non-adhesive protective cover 11 to pass therethrough. The exterior surface 18 of the first layer 12 contacts the embossing roll 64 to form a co-extruded embossed thermoplastic laminate 24. The embossing roll 64 forms a plurality of indentations 52 in the exterior surface 18 of the first layer 12 and a plurality of protrusions 54 in the exterior surface 22 of the second layer 14, see FIGS. 9 and 10.

The method further includes passing the co-extruded embossed laminate 24 around at least a portion of a chill roll 68 to cool the laminate 24 and form the co-extruded embossed, reusable, non-adhesive protective cover 11. The chill roll 68 rotates in a counterclockwise direction, A guide roll 70 and a doctor blade (not shown), or some other removal mechanism known to those skilled in the art, can be used to remove the co-extruded embossed, reusable, non-adhesive protective cover 11 from the chill roll 68. The co-extruded embossed, reusable, non-adhesive protective cover 11 is free of polyvinyl chloride. The co-extruded embossed, reusable, non-adhesive protective cover 11 can then be rolled up on a spindle and be placed in storage or be shipped to a customer.

Figure 12:
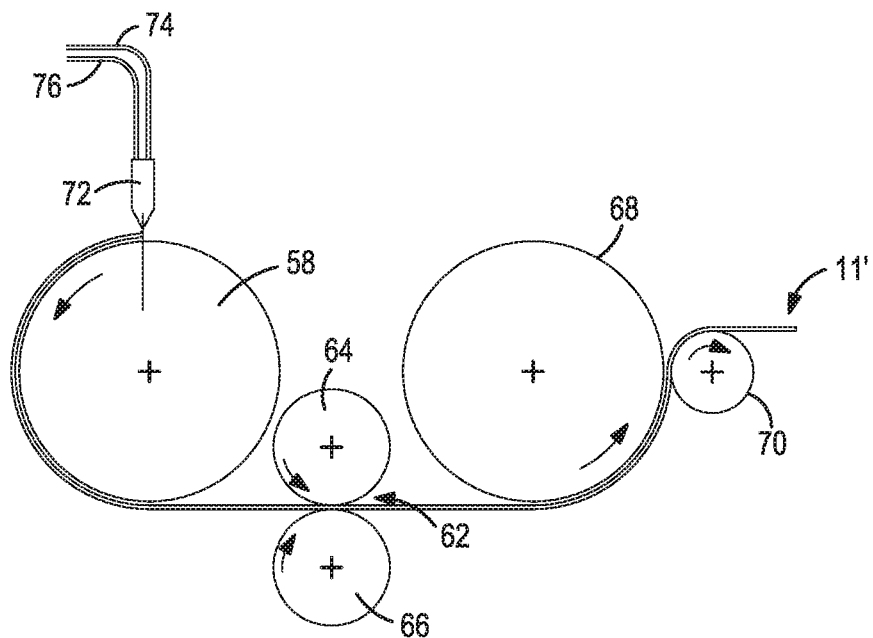
FIG. 12 is a schematic for making an embossed, coextruded film, non-adhesive protective cover using a manifold extruder.

Referring now to FIG. 12, a second method is shown for producing a co-extruded embossed, reusable, non-adhesive protective cover 11'. This method utilizes a manifold extruder 72. In this method, a first polymer (not shown) is routed through a first line 74 into the manifold extruder 72 and a second polymer (not shown) is routed through a second line 76 into the manifold extruder 72. The first and second polymers can be solid resin pellets which are heated to a semi-solid or viscous state. In the manifold extruder 72, the first and second polymers are extruded as distinct layers onto the cast roll 58. The remainder of this method is identical to that described above for the method shown in FIG. 11, This method forms a manifold co-extrusion, embossed, reusable, non-adhesive protective cover 11'.

It should be understood that a reusable, non-adhesive protective cover 11', having three or more layers, can be produced using the manifold apparatus and method depicted in FIG. 12.

Figure 13:
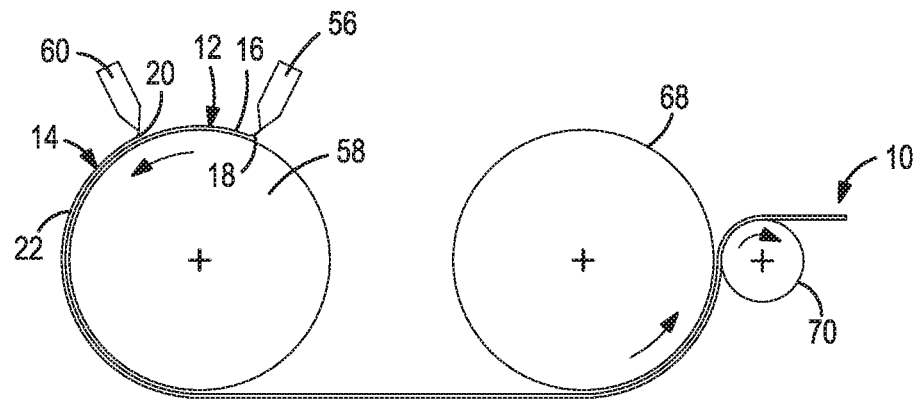
FIG. 13 is a schematic for making a non-embossed, coextruded film, non-adhesive protective cover.

Referring now to FIG. 13, a third method is shown for producing a non-embossed, co-extruded, reusable, non-adhesive protective cover 10. This method is similar to that shown in FIG. 11 except the embossing roll 64 and the rubber roll 66 are removed, Because of this, the non-adhesive protective cover 10 is not embossed.

Figure 14:
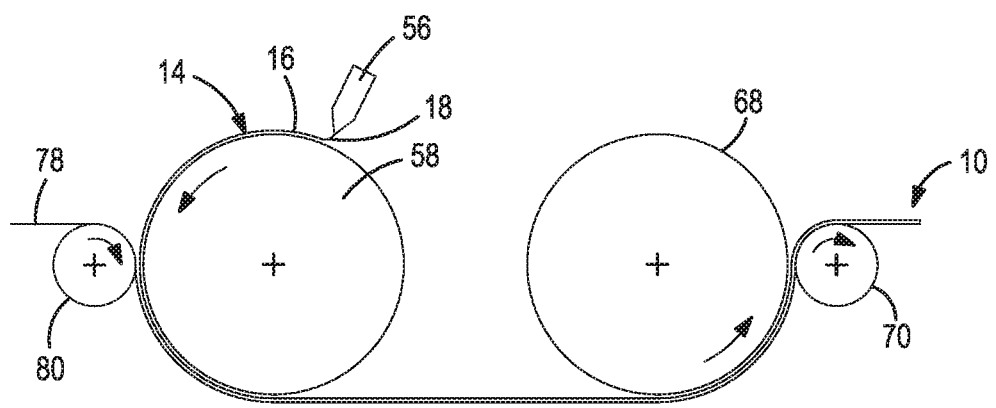
FIG. 14 is a schematic for making a non-embossed, film extrusion coat, non-adhesive protective cover.

Referring to FIG. 14, a fourth method is shown for forming a non-embossed, film extrusion coat, reusable, non-adhesive protective cover 10. This method is similar to that shown in FIG. 13 except instead of using a second extruder 60, a thermoplastic film layer 78 is directed by a guide roll 80 onto the interior surface 16 of the first layer 12. The guide roll 80 rotates in a clockwise direction. The thermoplastic film layer 78 can be formed from a polymer, copolymer, homopolymer, etc. For example, the thermoplastic film layer 78 could be a low density polyethylene film. Since the embossing roll 64 and the rubber roll 66 have been removed, the non-adhesive protective cover 10 will not be embossed.

Figures 15, 16:
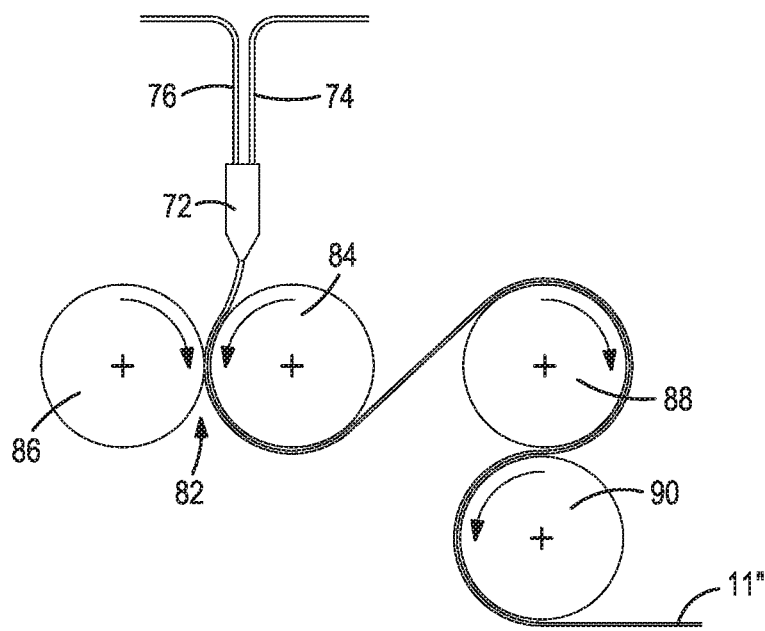
FIG. 15 is a schematic for making a non-embossed, coextruded film, non-adhesive protective cover.
FIG. 16 is a schematic for making an embossed, coextruded film, non-adhesive protective cover.

Referring to FIG. 15, another method of making a non-embossed, coextruded film, non-adhesive protective cover 11" is shown. This method starts out the same as that shown in FIG. 12. In the manifold extruder 72, the first and second polymers are extruded as distinct layers onto the smooth steel roll 84, The distinct layers are directed between a nip 82 formed by a smooth steel roll 84 and a rubber backing roll 86. The smooth steel roll 84 rotates in a counterclockwise direction and the rubber backing roll 86 rotates in a clockwise direction. The size of the nip 82 can vary. After passing through the nip 82 the film is directed around at least a portion of the circumference of a pair of chill rolls 88 and 90. The chill roll 88 rotates in a clockwise direction and the other chill roll 90 rotates in a counterclockwise direction. The pair of chill rolls 88 and 90 can be vertically arranged. After being chilled, the reusable, non-adhesive protective cover 11" can be routed to a windup station (not shown) where it can be accumulated into rolls of various diameters.

Lastly, referring to FIG. 16, another method of making an embossed, coextruded film, non-adhesive protective cover 11''' is shown. This method is similar to that depicted in FIG. 15 except the smooth steel roll 84 is replaced with an embossing roll 92. The embossing roll 92 will emboss the film as it passes through the nip 82.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A method of forming a reusable, co-extruded embossed non-adhesive protective cover, comprising the steps of:
   a) extruding a first layer of a thermoplastic film onto a rotatable cast roll, said first layer containing from between about 18% to about 20% of low density polyethylene film, about 70% hydrogenated styrene block copolymer, and from between about 10% to about 12% of a flame retardant, said first layer having an interior surface and an exterior surface, b) extruding a second layer of a thermoplastic film onto said interior surface of said first layer to form a co-extruded laminate, said second layer having an exterior surface exhibiting attachment and release capabilities such that a joint tape can be used to join adjacent sheets of the reusable, non-adhesive protective cover together;

c) advancing said co-extruded laminate between a nip formed by an embossing roll and a rubber roll, said exterior surface of said first layer contacting said embossing roll to form a co-extruded embossed laminate; and d) passing said co-extruded embossed laminate around at least a portion of a chill roll to cool said laminate and form said reusable, co-extruded embossed non-adhesive protective cover, said cover being free of polyvinyl chloride.

2. The method of claim 1 wherein said first layer has a static coefficient of friction of at least about 0.5.

3. The method of claim 1 wherein said first layer is a different material than said second layer.

4. The method of claim 1 wherein said second layer contains from between about 77% to about 79% of linear low density polyethylene film, about 10% of linear low density polyethylene, about 10% of a flame retardant, and from between about 1% to about 3% of a colorant.

5. The method of claim 1 wherein said embossing roll forms a plurality of indentations in said exterior surface of said first layer.

6. The method of claim 1 wherein said embossing roll forms a plurality of protrusions in said exterior surface of said second layer.

7. The method of claim 1 wherein said first layer is a copolymer film of low density polyethylene and a styrene block copolymer.

8. The method of claim 1 wherein said second layer contains from between about 5% to about 20% of a flame retardant.

9. The method of claim 1 wherein said rubber roll rotates in a counter clockwise direction.

10. A method of forming a reusable, co-extruded embossed non-adhesive protective cover, comprising the steps of:

a) extruding a first layer of a thermoplastic film onto a rotatable cast roll, said first layer having an interior surface and an exterior surface, said first layer containing from between about 5% to about 20% of a flame retardant;

b) extruding a second layer of a thermoplastic film onto said interior surface of said first layer to form a co-extruded laminate, said second layer containing from between about 77% to about 79% of linear low density polyethylene film, about 10% of linear low density polyethylene, about 10% of a flame retardant, and from between about 1% to about 3% of a colorant, said second layer having an exterior surface exhibiting attachment and release capabilities such that a joint tape can be used to join adjacent sheets of the reusable, non-adhesive protective cover together, c) advancing said co-extruded laminate between a nip formed by an embossing roll and a rubber roll, said exterior surface of said first layer contacting said embossing roll to form a co-extruded embossed laminate; and d) passing said co-extruded embossed laminate around at least a portion of a chill roll to cool said laminate and form said reusable, co-extruded embossed non-adhesive protective cover, said cover being free of polyvinyl chloride.

11. The method of claim 10 wherein said first layer has a static coefficient of friction of at least about 0.5.

12. The method of claim 10 wherein said cast roll rotates in a counter clockwise direction.

13. The method of claim 10 wherein said embossing roll rotates in a clockwise direction.

14. The method of claim 10 wherein said first layer contains from between about 18% to about 20% of low density polyethylene film, about 70% hydrogenated styrene block copolymer, and from between about 10% to about 12% of a flame retardant.

15. The method of claim 10 wherein said second layer is a different material than said first layer.

16. A method of forming a reusable, co-extruded embossed non-adhesive protective cover, comprising the steps of:

a) extruding a first layer of a thermoplastic film onto a rotatable cast roll, said first layer containing from between about 18% to about 20% of low density polyethylene film, about 70% hydrogenated styrene block copolymer, and from between about 10% to about 12% of a flame retardant, said first layer having an interior surface and an exterior surface, and said first layer having a static coefficient of friction of at least about 0.5;

b) extruding a second layer of a thermoplastic film onto said interior surface of said first layer to form a co-extruded laminate, said second layer having an exterior surface exhibiting attachment and release capabilities such that a joint tape can be used to join adjacent sheets of the reusable, non-adhesive protective cover together, and said second layer contains from between about 5% to about 20% of a flame retardant;

c) advancing said co-extruded laminate between a nip formed by an embossing roll and a rubber roll, said exterior surface of said first layer contacting said embossing roll to form a co-extruded embossed laminate; and d) passing said co-extruded embossed laminate around at least a portion of a chill roll to cool said laminate and form said reusable, co-extruded embossed non-adhesive protective cover, said cover being free of polyvinyl chloride.

17. The method of claim 16 wherein a first polymer is routed through a first line to a manifold extruder and a second polymer is routed through a second line to said manifold extruder, and in said manifold extruder said first and second polymers are extruded as distinct layers onto said rotatable cast roll.

18. The method of claim 16 wherein the first layer, the second layer and the third layer can be extruded onto said rotatable cast roll using a manifold extruder.

19. The method of claim 16 wherein said first layer is a different material than said second layer.

20. The method of claim 16 wherein said second layer contains from between about 77% to about 79% of linear low density polyethylene film, about 10% of linear low density polyethylene, about 10% of a flame retardant, and from between about 1% to about 3% of a colorant.

\* \* \* \* \*